(12) United States Patent
Hörnig

(10) Patent No.: US 7,511,747 B2
(45) Date of Patent: Mar. 31, 2009

(54) METHOD FOR NOISE CORRECTION FOR A FLAT-PANEL DETECTOR

(75) Inventor: Mathias Hörnig, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 666 days.

(21) Appl. No.: 11/092,796

(22) Filed: Mar. 29, 2005

(65) Prior Publication Data

US 2005/0219388 A1 Oct. 6, 2005

(30) Foreign Application Priority Data

Mar. 31, 2004 (DE) ................. 10 2004 016 585

(51) Int. Cl.
H04N 9/64 (2006.01)
(52) U.S. Cl. .................................. 348/243
(58) Field of Classification Search ............... 378/22, 378/207, 98.5; 348/241, 243
See application file for complete search history.

(56) References Cited

U.S. PATENT DOCUMENTS

| | | |
|---|---|---|
| 5,617,461 A | 4/1997 | Schreiner |
| 6,418,241 B1 | 7/2002 | Schreiner |
| 6,453,008 B1* | 9/2002 | Sakaguchi et al. ......... 378/98.7 |
| 6,497,511 B1 | 12/2002 | Schmitt et al. |
| 6,697,663 B1 | 2/2004 | Lin |
| 2002/0140830 A1* | 10/2002 | Shirakawa et al. ......... 348/245 |
| 2003/0202111 A1* | 10/2003 | Park ......................... 348/243 |

FOREIGN PATENT DOCUMENTS

| | | |
|---|---|---|
| DE | 42 32 401 A1 | 3/1994 |
| DE | 195 16 832 C1 | 11/1996 |
| DE | 195 27 148 C1 | 1/1997 |
| DE | 196 15 178 C2 | 10/1997 |
| DE | 196 31 385 A1 | 2/1998 |
| DE | 197 46 623 C1 | 11/1998 |
| DE | 198 23 958 C2 | 12/1999 |
| DE | 198 60 036 C1 | 3/2000 |
| DE | 198 41 419 C2 | 4/2000 |
| EP | 0 974 064 B1 | 1/2000 |
| EP | 1 034 664 B1 | 9/2000 |

OTHER PUBLICATIONS

ATMEL®, "Area Array CCD Image Sensor (1024×1024 Pixels with Antiblooming)", TH7888A, Rev. 1999A-Image-09/03, pp. 1-21, San Jose, CA, USA.

* cited by examiner

Primary Examiner—Ngoc-Yen T Vu
Assistant Examiner—Nicholas G Giles

(57) ABSTRACT

For the purpose of noise correction for an x-ray flat-panel detector (2) it is firstly provided that in the dark image—without radiation impinging on the detector panel (4)—the noise is recorded for the subareas of an active area (8) and from this, subarea-specific correction factors are determined by means of which the respective signal value of the respective subarea is corrected in imaging operation. A dark area correction factor (DF1, DF2) is also determined in each case from the noise of two dark areas (6) that are spaced apart with respect to each other. In order to determine subarea-specific signal correction factors (SK), each of the DA correction factors (DF1, DF2) is weighted with a subarea-specific weighting factor (g1, g2), in particular a distance factor (a). By means of said measure improved noise correction is achieved.

9 Claims, 1 Drawing Sheet

METHOD FOR NOISE CORRECTION FOR A FLAT-PANEL DETECTOR

CROSS REFERENCE TO RELATED APPLICATIONS

This application claims priority to the German application No. 10 2004 016 585.8, filed Mar. 31, 2004 which is incorporated by reference herein in its entirety.

FIELD OF INVENTION

The invention relates to a method for noise correction for a flat-panel detector which is embodied for acquiring rays, more particularly x-rays.

BACKGROUND OF INVENTION

A flat-panel detector of said type usually has an amorphous silicon (aSi) flat panel that is subdivided into individual pixel arrays and of which at least a subarea is provided with a photo-active coating forming the scintillator layer. Said photo-active coating converts impinging x-rays into light pulses which are then detected by a semiconductor sensor assigned to the respective pixel array and forwarded as an electrical signal to a readout amplifier. Each of the pixel arrays arranged in lines and columns has a semiconductor sensor of said type. The individual pixel arrays form a matrix array.

A plurality of readout amplifiers are usually provided which in turn have a plurality of channels, for example 120, for the respective columns of the matrix array. One column is therefore read out via each channel, this process taking place line by line, which is to say serially. The detected light intensity is aggregated in the individual semiconductor sensors during the time that elapses between two readout operations.

SUMMARY OF INVENTION

Owing to the plurality of electronic components employed, in particular owing to the readout amplifiers, the actual light signals are superimposed with noise, in particular line noise. In order to reduce said noise, the flat-panel detector is usually subdivided into an active area, which is exposed to the x-rays, and at least one dark area, referred to also as a "Dark Reference Zone (DRZ)", which in particular does not have a photo-active layer. The noise to be assigned to the dark area is detected and used as a correction value for the signals detected by the active area (line noise correction: LNC). Sometimes two or more of said dark areas are provided. For the purpose of noise correction a mean value is determined in this case from the correction factors assigned to the individual dark areas. However, in certain conditions, in particular when the noise of the individual dark areas varies considerably, this can lead to the generation of further noise components.

An object of the invention is to enable improved noise correction.

Said object is achieved according to the invention by means of a method for noise correction in a flat-panel detector, in particular for acquisition of x-rays, which has a matrix-type detector panel as well as a plurality of readout amplifiers for reading out the signals detected in the detector panel. Said detector panel has at least one dark area and one active area which is subdivided into subareas, that is to say lines and columns, whereby in order to correct signal noise in the dark image, that is to say without radiation impinging on the detector panel, the noise is recorded for the subareas of the active area and from this subarea-specific correction factors or correction values are determined by means of which the respective signal value of the respective subarea is corrected during operation.

Through this measure a noise which is to be assigned to the respective subarea is detected in the dark image, i.e. without radiation impinging on the detector panel. In imaging operation with radiation the respective signal value of the respective subarea is then corrected. This already provides a first significant improvement in noise correction, since the noise to be assigned to the individual subareas is used directly and specifically for a correction.

According to a useful development the detector panel in this case has at least two dark areas spaced apart from each other. In order to correct signal noise, a noise to be assigned to the respective dark area is recorded and from this a dark area correction factor or correction value (DA correction factor) is determined for each of the dark areas. From these, different signal correction factors (S correction factors) are then derived for the individual subareas (columns) in that the DA correction factors are in each case weighted with a subarea-specific weighting factor.

This embodiment is based on the consideration that the even weighting of the individual correction values of the dark areas that is typically carried out for noise correction in the case of two dark areas can lead to distort ions and to the generation of additional noise components if there are wide variations between the individual correction values. As a result of the weighting performed, a relevance of the correction value of the respective dark area is therefore determined for the individual subarea by way of the weighting factor and an overall improvement in noise correction is thus enabled.

This method with the weighting of the individual correction values for determining a signal correction value is performed in particular in addition to and in combination with the subarea-specific correction factors that were determined for each subarea in the dark image. A common correction factor or correction value is usefully derived in a suitable manner from the subarea-specific correction factors and the signal correction factors. Since the signal correction factor can also be determined currently during the imaging operation and preferably also is, a dynamic adjustment of the correction values is thus made possible.

However, the method in relation to the signal correction factors can also be used totally independently of the method in relation to the subarea-specific correction factors.

According to a useful development, the DA correction factors are weighted with a distance factor as a measure of the distance of the respective subarea from the respective dark area. By means of this measure the local proximity of the individual subareas of the active area to the respective dark area is therefore taken into account in an advantageous manner. The closer the subarea is arranged to the respective dark area, the higher is its weighting in the determination of the signal correction factor. In this case in particular the distance of the respective subarea from the respective dark area is taken into account linearly in the weighting factor.

In this case the dark areas that are used for determining the DA correction factors are usefully arranged at opposite external edge areas of the detector panel.

In order to determine the respective DA correction factor noise signals are preferably acquired from a plurality of subareas, in particular columns, of the respective dark area and a mean value, in particular a mean line value for the respective line, is formed from the individual noise signals.

The detector area preferably has pixel arrays arranged in lines and columns and a number of columns are read out simultaneously line by line via a respective readout amplifier, a specific correction factor being determined for each readout amplifier. To allow a simpler evaluation, a correction factor or correction curve across the individual channels of the readout amplifier is therefore taken into account for each readout amplifier.

According to a useful development, different DA correction factors are determined for different operating modes. Different operating modes are produced, for example, in particular as a result of different magnifications (zoom function). In the different operating modes, subareas of the detector panel are partially cove red from the path of the rays by means of masks or the like. In this case the dark area is preferably composed both of the edge areas without the photo-active coating and of the subareas covered by the masks. In this case a dark area is therefore generally taken to mean that area which is not struck by x-ray radiation. Thus, taking the operating modes into account also advantageously includes in particular a variable distribution between the dark areas and the active area. This allows a more accurate and operating mode specific noise correction.

The subarea-specific correction factors that are determined in the dark image for the active area are also usefully determined for each operating mode. This usefully takes place recurrently at specific time intervals, for example periodically, in order to enable changes over time to be recorded.

In addition, the DA correction factors are preferably determined during operation and if necessary adjusted. To this extent, therefore, a dynamic correction is performed since the DA correction factors are constantly checked. Through this measure, and in similar fashion also through the recurrent determination of the subarea-specific correction factors, changes in the noise response of the readout amplifier over its lifetime or due to changes in temperature, e.g. after the detector is switched on, are therefore compensated by means of the noise correction method proposed here.

BRIEF DESCRIPTION OF THE DRAWINGS

An exemplary embodiment of the invention is explained in more detail below with reference to the drawing, in which, in schematic and simplified representations.

DETAILED DESCRIPTION OF INVENTION

Figure 1:
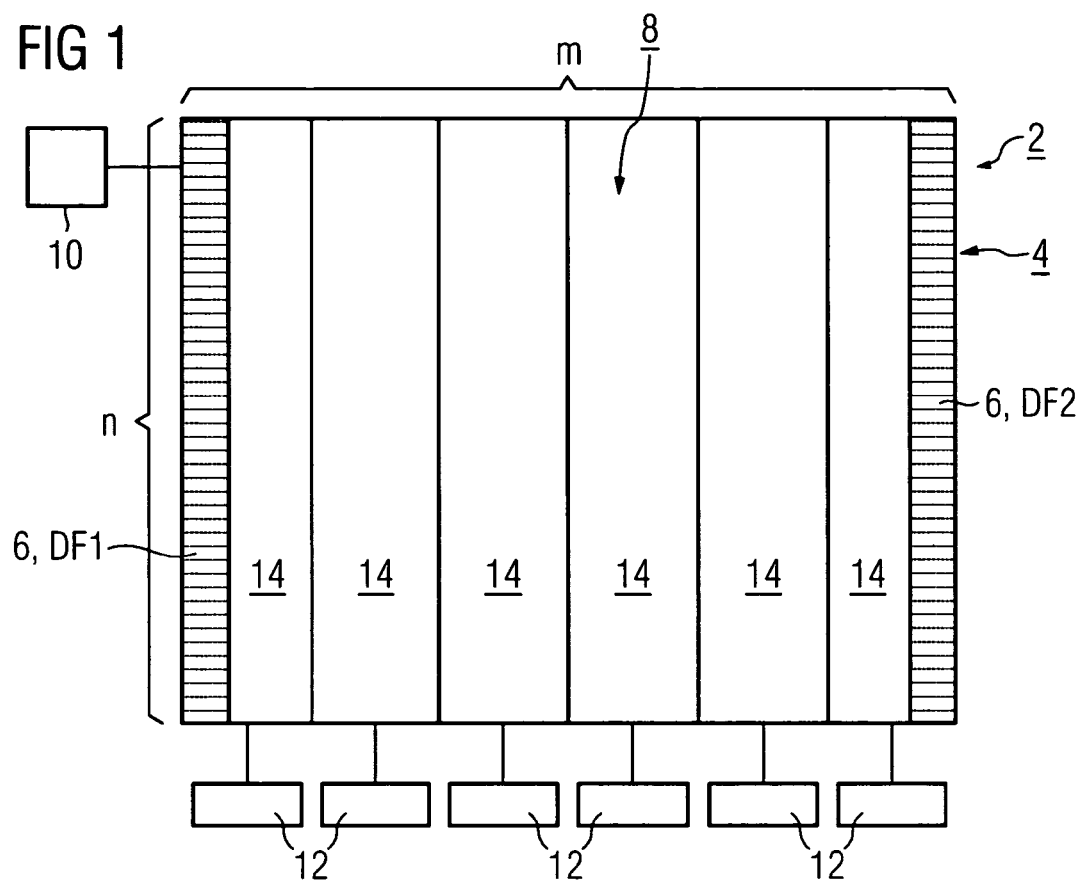
FIG. 1 shows a flat-panel detector in the form of a block diagram.

A solid-state flat-panel detector 2 according to FIG. 1 has a matrix-type detector panel 4 having a total of n lines and m columns. The detector panel 4 has on its edge sides in each case a plurality of columns covering a radiation-insensitive dark area 6 and, between said two dark areas 6, a radiation-sensitive, active area 8. Unlike in the area of the active area 8, in the area of the dark areas 6 the detector panel 4 does not have a photo-active or scintillator layer that generates light quanta which are then detected by semiconductor detectors, not shown in more detail here, when x-rays impinge. In operating modes in which a more extensive subarea of the detector panel 4 is shaded by, for example, masking, the dark areas 6 can also extend to areas which, although in principle having a photo-active coating, are not irradiated in the respective operating mode.

The flat-panel detector 2 furthermore has a driving device 10 for driving the detector panel 4 line by line. Each pixel array of the detector panel 4 has a semiconductor sensor for registering the light intensity as a measure of the x-rays impinging on the respective pixel array. A total of m sensors of this kind are therefore arranged in one line.

The detector panel 4 further has a plurality of readout amplifiers 12 which in turn have a plurality of individual channels, for example 120, with each channel being assigned to precisely one of the total of m columns. The total of m columns of the detector panel 4 is therefore subdivided into individual column blocks 14, as shown in FIG. 1, each of which is assigned to a readout amplifier 12. As can further be seen from FIG. 1, the dark areas 6 do not normally extend across a complete column block 14.

During operation the detector panel 4 is driven via the driving device 10 line by line, which is to say that the detector panel 4 is driven in such a way that one line is in each case read out serially after the other. Each readout amplifier 12 therefore receives line by line the signal data of its columns of the respective column block 14 that are assigned to it. Owing to the evaluation electronics the actual image signals are overlaid by electronic noise emanating in particular from the readout amplifiers 12. In order to correct this noise and suppress it to the greatest extent possible, there are provided in particular the following two steps which in principle can be performed independently of each other.

a) The noise of each readout amplifier 12 is recorded in the dark area, i.e. without impinging x-ray radiation, for all or at least largely all columns and therefore readout amplifiers 12. From this, subarea-specific correction factors are determined by means of which the image or signal values acquired during normal operation are corrected, i.e. the correction values are usually subtracted from the image values.

Figure 3:
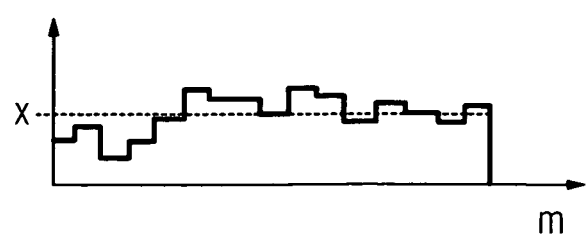
FIG. 3 shows a schematic representation of the noise response of a readout amplifier across its individual channels for determining a DA correction factor.

During the detection of the noise in the dark image, a noise signal curve is determined for each readout amplifier 12, as shown by way of example in FIG. 3. Moreover, a channel- and therefore column-specific noise is recorded for each channel of the readout amplifier 12. In order to determine the subarea-specific correction factor in each case it is possible to assign a separate correction factor to each individual channel and therefore to each individual column of the detector panel 4. As an alternative to this, an arithmetic mean value X is determined for each readout amplifier 12 from the recorded noise signal curve, which mean value is then used as the subarea-specific correction factor for the respective line for all columns of the respective readout amplifier 12.

In order to achieve an ideally optimal noise correction also for different operating modes it is further provided that said subarea-specific correction factors are recorded and used for the different operating modes. Furthermore said subarea-specific correction factors are recurrently, for example periodically, checked and if necessary corrected if the noise response of the electronic components has changed, for example due to long-term effects or the effects of temperature.

b) In a second step the noise to be assigned to the dark areas 6 is used in order to determine a dark area correction value (DA correction factor) DF1, DF2 from which a signal correction value (S correction factor) SK is then derived in turn for the respective columns of the active area 8. For the purpose of correction, the signal correction value SK is usually deducted from the signal value. Moreover, the two DA correction values DF1, DF2 are weighted differently for the individual columns or for the individual column blocks 14, with the result that a different S correction value SK is produced for each column or each column block 14. The distance of the respective column or the respective column block 14 from the respective dark area 6 is usefully included as an important weighting factor.

In the exemplary embodiment according to FIG. 1 two different DA correction factors DF1, DF2 are assigned to the individual detector panels 6, where DF1 is relevant to the left-hand dark area and DF2 is relevant to the right-hand dark area 6.

With a conventional noise correction method, the arithmetic mean across all channels of the dark area 6 is simply derived as the S correction factor. However, in the case of significantly different noise responses of the dark areas 6 this would lead to an erroneous noise correction, in particular in the area close to the edge in the dark areas 6.

The weighting that is now provided is used to factor in the distance of the individual areas from the respective dark area 6. According to FIG. 2 a separate, averaged S correction factor SK is determined in this case from the DA correction factors DF1, DF2 for each readout amplifier 12. In this case FIG. 2 firstly shows the progression of the S correction factor SK plotted against the columns m of the detector panel 4 (dotted curve). For the subarea adjacent to the left-hand detector panel 6, the DA correction value DF1 is weighted with the factor 1, and DF2 with the factor zero. Said weighting factors change, the closer the channels are aligned with the right-hand dark area 6. In the exemplary embodiment a readout amplifier specific weighting was carried out in this case, so the distance of the column blocks 14 from the dark areas 6 was therefore taken into account as a basis for the weighting factor.

Figure 2:
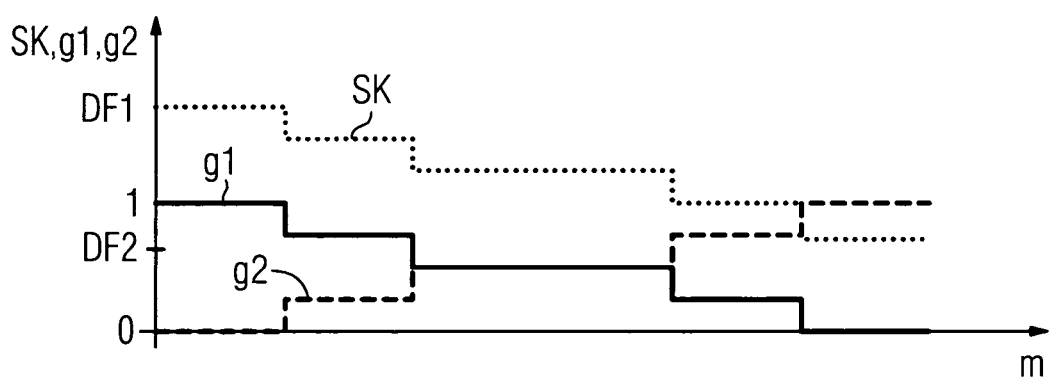
FIG. 2 shows the schematic curve of a signal correction factor across the individual columns of the flat-panel detector.

Also plotted in FIG. 2 in addition to the S correction factor SK is the curve of the weighting factors g1 for the left-hand dark area 6 (unbroken line) and g2 for the right-hand dark area 6 (dashed line).

The S correction factor SK is determined for example according to or on the basis of the following linear formula:

$SK=0.5(DF1(1-a)+DF2a)$, where $1-a=g1$ and $a=g2$ where a is a distance value for the distance of the dark area 6 with the DA correction factor DF1. In order to determine the DA correction factor DF1, DF2 the arithmetic mean of the signal noise across all channels of the dark area 6 is usefully formed, as indicated schematically in FIG. 3. If the dark areas 6 (left-hand and right-hand dark area) are different sizes, a weighting of the correction factors DF1 and DF2 corresponding to the size of the dark areas is preferably carried out.

The DA correction factors DF1, DF2 preferably are also checked and adjusted constantly during operation, thereby producing a very dynamic and therefore precise noise correction overall. Here too, operating mode specific DA correction factors are usefully determined for each individual operating mode, whereby the dark areas 6, that is to say the number of columns m to be assigned to the dark areas 6, can vary dependent on the respective operating mode. Here too, long-term effects and the effect of temperature are in turn taken into account and corrected as a result of the dynamic adjustment of the DA correction values DF1, DF2.

The invention claimed is:

1. A method of correcting digital noise generated by a flat-panel detector having a matrix-type detector panel and a plurality of readout amplifiers for reading out signals detected by the detector panel, the flat-panel configured to detect X-ray radiation and the detector panel comprising a dark area and an active area having a plurality of sub-areas, the method comprising:

measuring a digital noise generated by at least one of the sub-areas when the detector panel is not exposed to radiation;

calculating a correcting parameter for a respective sub-area based on the measured digital noise;

correcting an output signal of the respective sub-area when the detector panel is exposed to radiation during an operation of the detector panel using the correcting parameter;

measuring a digital noise generated by a first dark area and a second dark area spaced apart from one another;

determining a first dark area correcting parameter ($DF_1$) and a second dark area-correcting parameter ($DF_2$) for the first and the second dark areas using the measured digital noise generated by the first and second dark areas; and calculating a signal correcting parameter ($S_k$) individualized for a $k^{th}$ sub-area by weighting the first and the second dark area correcting parameters ($DF_1$) and ($DF_2$) with a first weighting factor ($g_1$) and a second weighting factor ($g_2$), wherein the first and the second dark area correcting parameters ($DF_1$) and ($DF_2$) are weighted in accordance with the following relationship:

$S_k=0.5*(DF_1*(DF_1*(1-\alpha)+DF_2*\alpha)$, where $\alpha$ represents a distance from the $k^{th}$ sub-area to the first dark area, $1-\alpha=g_1$, and $\alpha=g_2$.

2. The method according to claim 1, wherein the dark area correcting parameters are weighted with a distance value representing a distance of the respective sub-area from a dark area, the respective sub-area and the dark area assigned to the same detector panel.

3. The method according to claim 1, wherein the dark areas are arranged at opposite edge areas of the detector panel.

4. The method according to claim 1, wherein determining the first and second dark area correcting parameters includes measuring digital noise generated by a plurality of sub-areas of the dark areas and calculating a mean value based on the measuring digital noise generated by the sub-areas of the dark areas.

5. The method according to claim 1, wherein
the detector panel includes pixel arrays having lines and columns,
reading out the detector panel includes reading out a number of columns line by line using a readout amplifier assigned to the detector panel, and
a readout correcting parameter is determined for the readout amplifier.

6. The method according to claim 1, wherein determining the first and second dark area correcting parameters is based on a present operating mode of the flat-panel detector.

7. The method according to claim 1, wherein calculating the correcting parameter for the respective sub-area is determined for each operating mode of the flat-panel detector.

8. The method according to claim 1, wherein the first and second dark area correcting parameters are determined during an operation of the flat-panel detector, and the first and second dark area correcting parameters are adjusted if a present operating mode is switched to another operating mode.

9. The method of claim 1, wherein the first and second dark areas comprise different sizes relative to one another, and further comprising adjusting the correcting parameters ($DF_1$) and ($DF_2$) based on the size of a corresponding dark area.

* * * * *